No. 644,436. Patented Feb. 27, 1900.
R. H. MANTEL.
LIFTING VALVE GEAR FOR ENGINES.
(Application filed Nov. 1, 1899.)
(No Model.)
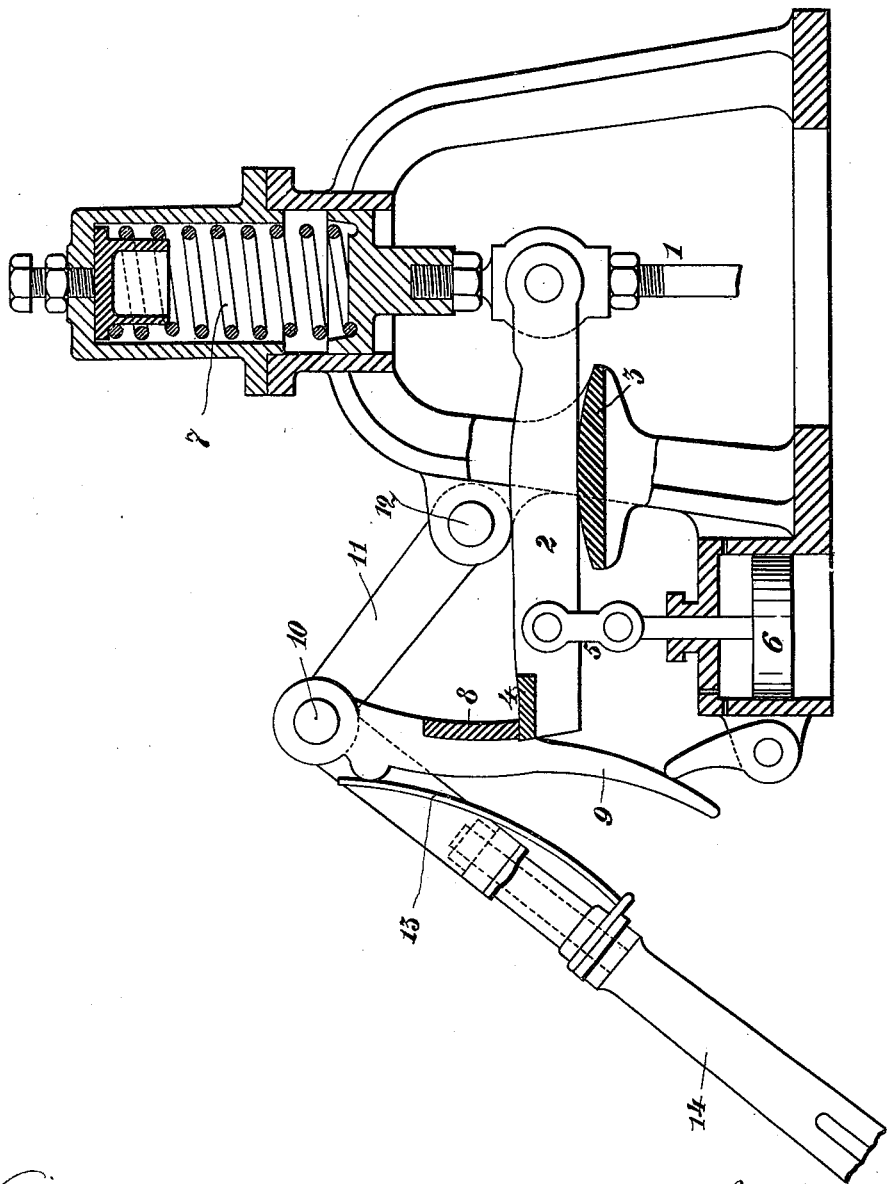
Witnesses
Chas H. Smith
J. Staib
Inventor
Rudolf Heinrich Mantel
per L. W. Serrell & Son
attys
THE NORRIS PETERS CO., PHOTO-LITHO., WASHINGTON, D. C.

UNITED STATES PATENT OFFICE.

RUDOLF HEINRICH MANTEL, OF RIGA, RUSSIA.

LIFTING-VALVE GEAR FOR ENGINES.

SPECIFICATION forming part of Letters Patent No. 644,436, dated February 27, 1900.

Application filed November 1, 1899. Serial No. 735,473. (No model.)

*To all whom it may concern:*

Be it known that I, RUDOLF HEINRICH MANTEL, a citizen of the Republic of Switzerland, residing at Riga, Russia, and consul of the Republic of Switzerland, in Riga, Russia, have invented certain new and useful Improvements in and Relating to Lifting-Valve Gear for Steam-Engines, of which the following is a specification.

Tangential levers bearing on a curved surface playing as a variable fulcrum have heretofore been used in steam-distributing lifting-valves acted upon by eccentrics—that is to say, by a positive force.

My invention consists in the combination of a tangential latch-lever bearing on a curved surface and playing as a variable fulcrum with such a steam-distributing lifting-valve as is normally closed by means of a spring and the opening of which is caused by the to-and-fro motion of a snapper, which, according to the position of the regulator of the engine, engages more or less with the said latch-lever, and thus lifts more or less the corresponding distributing-valve, and with an air or liquid brake acting upon the other end of the said lever, so as to have the said air or liquid brake acting upon the said lifting-valve with an increasing intensity of force according as the said valve is descending upon its seat.

The accompanying drawing illustrates by way of example one form of execution of the invention.

1 is the stem or rod of a steam-distributing lifting-valve of any suitable construction whatever, which is normally closed by means of a spiral spring 7.

2 is the latch-lever hinged to the said stem or rod 1 and intended to have its end 4 engaging from time to time with the nose 8 of a snapper 9, hinged at 10 to one end of a crank 11, the other end of which is hinged to a fixed pivot 12. The snapper 9 is acted upon by a spring 13 and caused to move to and fro by means of the rod 14 of any suitable eccentric whatever.

The lever 2 bears tangentially upon a curved surface 3, which plays like a variable fulcrum for the same, and it is connected by means of a link 5 to a piston 6 of an air or liquid brake intended to control the action of the spiral spring 7.

According as the snapper 9 will have depressed more or less the end 4 of the latch-lever 2 the two acting levers of the same, the length of which is determined by the point in which the edge of the tangential lever 2 is in contact with the curved surface 3, and therefore the said length, will decrease for the left-hand portion of said lever and increase for the right-hand portion of same, according as the steam-valve is lifted, and inverse. Now from this it results that the left-hand portion of the said lever 2 will increase in proportion of the depression of the valve-rod 1—that is to say, of the steam-valve—and that therefore the brake 6 will act with its greatest intensity whenever the said valve reaches its seat when thrown back by the spiral spring 7.

Having thus fully described my invention, I claim—

In steam-distributing lifting-valves for steam-engines the combination of the valve rod or stem with a latch-lever hinged with one end to the said rod or stem and acted upon by means of any suitable snapper whatever and with a curved surface upon which the said latch-lever bears tangentially and with an air or liquid brake acting upon the other end of the said lever so as to have the said air or liquid brake acting upon the said lifting-valve with an increasing intensity of force according as the said valve is descending upon its seat substantially as shown and described.

In testimony that I claim the foregoing as my invention I have signed my name in presence of two subscribing witnesses.

RUDOLF HEINRICH MANTEL. [L. S.]

Witnesses:
 C. A. LANGFORD,
 CHR. SCHÜLIE.